July 8, 1958  LA VERNE S. BIRKS, JR  2,842,670
FLAT CRYSTAL FLUORESCENT X-RAY SPECTROGRAPH
Filed Feb. 23, 1955  2 Sheets-Sheet 1

INVENTOR
LA VERNE S. BIRKS JR.

BY
ATTORNEYS

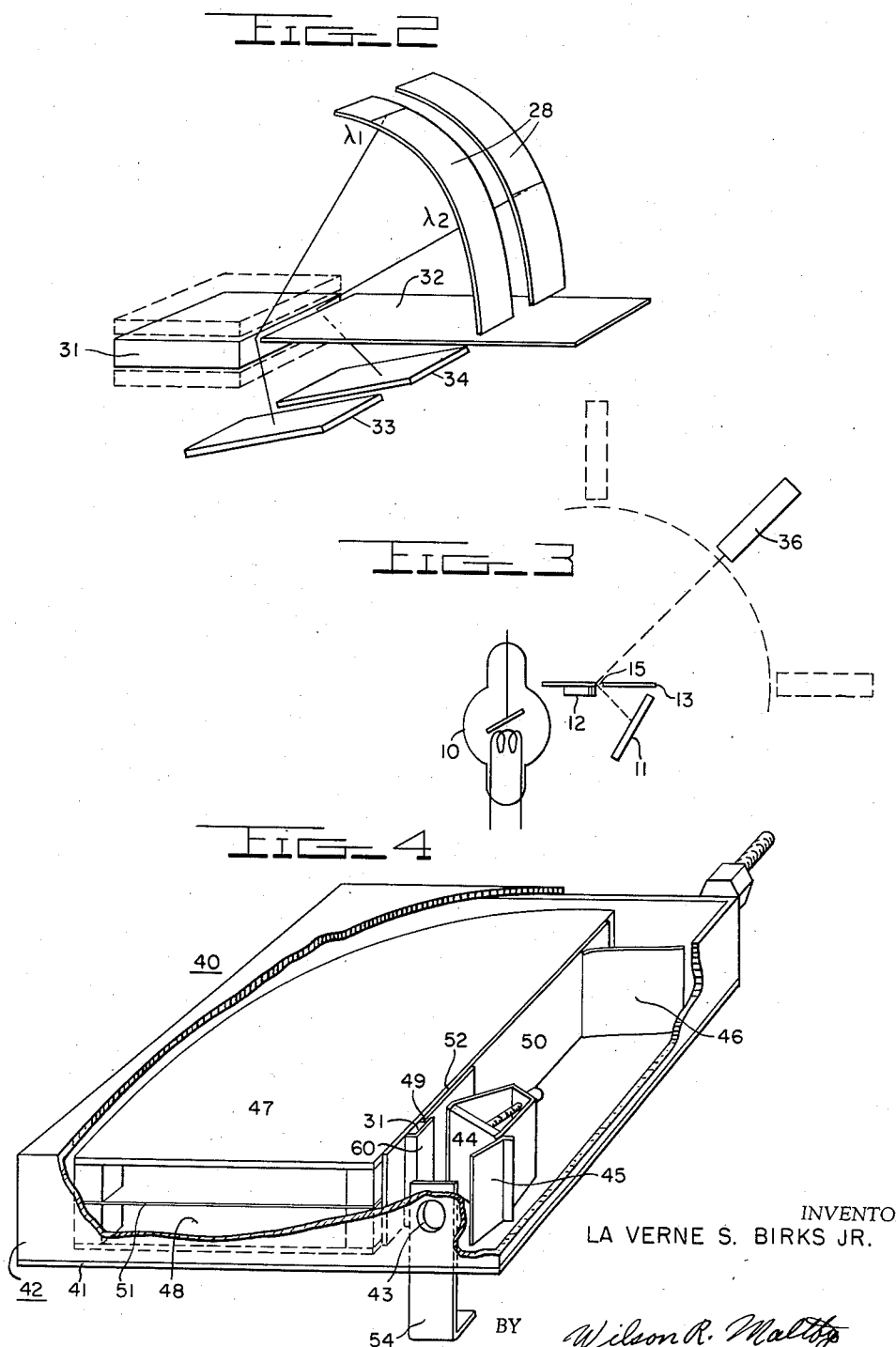

2,842,670

FLAT CRYSTAL FLUORESCENT X-RAY SPECTROGRAPH

La Verne S. Birks, Jr., Takoma Park, Md.

Application February 23, 1955, Serial No. 490,159

4 Claims. (Cl. 250—53)

(Granted under Title 35, U. S. Code (1952), sec. 266)

The invention described herein may be manufactured and used by or for the Government of the United States of America for governmental purposes without the payment of any royalties thereon or therefor.

The present invention relates to a fluorescent X-ray spectrograph and more particularly to an X-ray spectrograph which measures the wavelengths of more than one element simultaneously rather than serially.

In the past art of fluorescent X-ray spectroscopy, two basic procedures have been followed: In one, an extended, flat, analyzing crystal is used with a collimating system to provide resolution of wavelengths from an extended source which would otherwise overlap each other; in the other, the analyzing crystal is curved so as to converge radiation emanating from a point or line source. In the flat-crystal, collimator procedure, radiation from an extended source (the specimen) is confined to a parallel bundle of polychromatic radiation by a collimating system of tubes or blades, and diffraction of each particular wavelength is obtained by setting the crystal at the proper angle with respect to the bundle of parallel radiation. Only one wavelength is diffracted for each angular setting of the crystal so it is necessary to turn the crystal with time in order to record the whole spectra; that is, the various wavelengths are recorded serially. In the converging-crystal procedure, the source and crystal are located on the Rowland circle. For each relative position of the source and crystal on the circle, only one wavelength will satisfy the proper angular relationships to be diffracted, and as in the previous procedure, it is necessary to move the crystal with time in order to record the whole spectra.

The present invention is related to X-ray spectroscopy and makes use of diffraction of X-ray wavelengths by a crystal grating.

The spectrograph of the present invention differs radically in principle from past known spectrographs. The specimen and crystal are so arranged (as will be described) that the whole X-ray wavelength range is diffracted and recorded simultaneously rather than serially. As usual the X-rays are diffracted by the crystal in accordance with Bragg's law which is, $$n\lambda = 2d \sin \theta$$

where $n$ is the order of diffraction, $\lambda$ is the wavelength in Angstrom units, $d$ is the crystalline interplanar spacing in Angstrom units, and $\theta$ is the angle between the radiation and the crystalline planes.

In order to prevent overlapping of the various diffracted wavelengths (that is, to provide adequate resolution of the various wavelengths), diffracted radiation is constrained to come from a relatively narrow region on the flat-crystal, diffracting surface. The confinement of the diffracting region is accomplished physically with a shield means terminating at a position juxtaposed to the crystal and defining therewith a diffraction limiting slit. Thus, only a narrow bundle of each wavelength will be passed on to the detector, and these diverging bundles, being narrow will not overlap each other. Radiation of each wavelength strikes the narrow diffracting crystal region at the proper angle from some region of the extended source (specimen); thus all wavelengths are diffracted simultaneously without any parts of the spectograph moving. Radiation striking elsewhere on the crystal will be stopped by the shield means and not allowed to pass on to a radiation sensitive means.

It is accordingly an object of the present invention to simultaneously record wavelengths of different elements.

Another object of this invention is to enable anyone to record more than one spectra at the same time.

A further object of this invention is to provide a simple, inexpensive X-ray spectrograph for recording the spectra of one or more specimens with one single-crystal.

Yet another object of the present invention is to record a complete spectra without any moving parts.

Still another object of the present invention is to simultaneously record the spectra of one specimen with two different diffracting crystals.

A final object of the present invention is to identify elements as distinguished from the identity of compounds by use of spectra.

Other objects and advantages of the invention will hereinafter become more fully apparent from the following description of the annexed drawings which illustrate the preferred embodiments, and wherein:

Fig. 2 is a diagrammatic view of an embodiment of the invention illustrating a diffracting crystal, two different specimens and a recording film.

Fig. 3 is an embodiment of the present invention illustrating the use of a device such as a Geiger-counter, proportional counter or scintillation counter as the detector.

Fig. 4 is a perspective view illustrating the relationship of the various parts.

Figure 1:
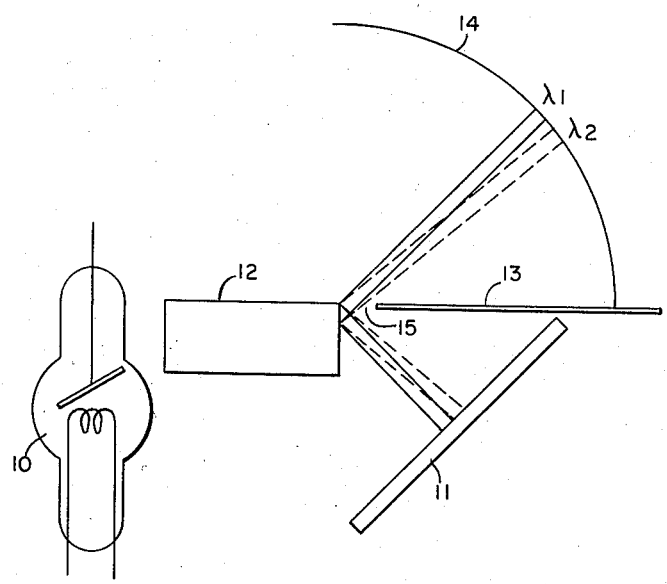
Fig. 1 is a diagrammatic view of an embodiment of the invention illustrating a diffracting crystal and the non-overlapping, diffracted wavelengths recorded on a photographic film as the detector.

Referring now to Fig. 1, there is illustrated a diagrammatic view of one embodiment which illustrates an X-ray source 10, radiating on a specimen 11, and exciting the characteristic X-ray wavelengths from the elements in the specimen; parallel bundles of wavelengths $\lambda_1$, and $\lambda_2$ shown are diffracted from a thin, flat crystal 12, having planes parallel to the end. The crystal can be made of any convenient material, one preferred material being of the alkali halide class such as lithium fluoride or sodium chloride. The crystalline, interplanar spacing, $d$, limits the longest wavelength which can be diffracted to a value of $\lambda = 2d$ (from Bragg's law when $\sin \theta$ goes to its maximum value of unity). There is no theoretical limit on the short wavelength end, but practical considerations set a limit of the order of 0.5 Angstrom units. The crystal 12 is positioned parallel to a shield 13, opaque to X-radiation which terminates at a position juxtaposed to the crystal to form a limiting slit 15, which limits the breadth of the parallel diffracted bundles allowed to pass on to the detector. The limited parallel bundles $\lambda_1$ and $\lambda_2$ diffracted from the crystal are recorded distinctly as two separate wavelengths on a photographic film 14. The detector in the preferred form is a photographic film but may be a device such as a Geiger-counter, proportional counter or scintillation counter as shown in Fig. 3.

Resolution can be controlled by two methods; one method is to vary the limiting slit which has limits between zero and 0.5 cm. by adjusting the shield 13. The other method is to vary the distance from the crystal to the film. The preferred method is to vary the slit width. The optimum slit width will depend upon the specimen being examined; for instance, if $\lambda_1$ and $\lambda_2$ differ greatly from each other, there will be less tendency for overlap of the diffracted bundles and a larger slit width can be tolerated.

The embodiment shown in Fig. 2 illustrates a spectrograph with two different specimens, 33 and 34, and a crystal 31 which diffracts the radiation from each of the specimens. Shields prevent radiation from one specimen from striking the detector for the other specimen but are not shown for the sake of simplifying the drawing.

The film, in the preferred embodiment, is positioned along an arc of approximately 57.3 mm. radius with the crystal as the center of the arc so that 1 mm. along the film will correspond to one degree of the angle $\theta$ for easy interpretation of the spectra. A convenient radius of curvature for the film is 1–15 cm. but the invention is not limited to a curved film; the film may be flat and positioned at a convenient working distance from the crystal.

Figs. 1 and 2 are diagrammatic illustrations which show only two variations in detecting the spectra. Any combination of crystals and specimens can be used to record spectra, that is, there can be one crystal and two different specimens as shown in Fig. 2, or one unknown and one known element with one crystal; or two different crystals and two different specimens, or two different crystals and one specimen or one crystal and one specimen as shown in Fig. 1. The film is made of a single piece but when recording two different spectra the film may be in two pieces. A shield (not shown for sake of simplification) extending from the crystal(s) to the film prevents radiation of the two spectra from overlapping.

In Fig. 3 there is shown an embodiment having a movable detector to record the spectra, instead of a stationary film as shown in Figs. 1–2. The detector is moved about the instrument on an arc of a circle of which the crystal face is on the axis. When such a device is used to record the spectra, it is the only movable part since the different wavelengths are diffracted by the crystal in a diverging pattern.

Figure 5:
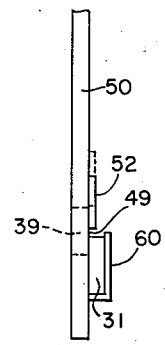
Fig. 5 is a top view showing the relationship of the crystal, and the shield juxtaposed to the crystal to form a slit for admitting diffracted radiation to the detector region.

In the perspective view of the spectrograph shown in Fig. 4 the top is cut away to more clearly show the details of the invention. The spectrograph 40, is an air and light tight, box-like device comprising a top portion 42, and a bottom portion 41, made of brass or any other metal opaque to X-radiation. The top portion 42, includes the sides extending downwardly to the bottom portion and one side thereof has an aperture 43, therein for admitting radiation from an X-ray source. Within said box-like device, a sector shaped spectra recording device is secured to the bottom portion 41. The sector has a top plate 47, and a bottom plate 48, with a metal strip 50, secured along one radius of the sector, said metal strip having a crystal holder 60, and an adjustable shield 52, secured thereto on opposite sides of a rectangular hole 39 (Fig. 5). Adjacent the crystal holder, a distance removed from the metal strip 50, a specimen holder 44 is secured to the bottom portion 41, said specimen holder being in line with aperture 43, so that radiation entering through the aperture will strike a specimen held in place by the specimen holder, causing the specimen to emit the characteristic X-ray wavelengths which radiate in all directions. The radiation which strikes a crystal 31, held by crystal holder 60, is diffracted in parallel bundles limited in breadth by the limiting slit 49, and recorded on a film along the included arc of the sector. The limiting slit 49, is formed by the adjustable shield 52, secured to metal strip 50, said shield being positioned juxtaposed to the crystal between the crystal and specimen holder so as to allow only the desired breadth of diffracted bundles to pass through the slit 49, to be recorded. The crystal holder 60, metal strip 50, and a shield 46 behind the specimen holder are for the purpose of absorbing the stray radiation in the device to keep the film from being fogged. On the outer side of the specimen holder and adjacent thereto a lead shield 45, is placed to prevent scattering of radiation from the specimen toward the outside.

In event the device is used with two crystals or two different specimens for recording two spectra simultaneously, a shield 51 is placed parallel to and between top plate 47 and bottom plate 48, extending from the crystal to the film to prevent radiation from one specimen from falling on the spectrum of the other.

If the spectrograph is to be evacuated or gas filled a thin membrane is secured over the aperture 43, and for purposes of keeping light from entering the device during removal to a dark room for loading or unloading, a shutter 54 is inserted through a slit in the bottom 41, so that the shutter will extend upwardly to cover the aperture 43 to prevent light from entering the inside.

In the operation of the fluorescent X-ray spectrograph of the present invention, primary radiation from an X-ray tube strikes the specimen which may be in the form of a solid, a powder, or even a liquid in a cell. The specimen emits the characteristic X-ray spectra of the various elements contained therein. This fluorescent radiation strikes the region of the analyzing crystal at the proper angle according to Bragg's law, $$n\lambda = 2d \sin \theta$$

for X-ray diffraction in order to be diffracted; where $n$ is the order of diffraction; $\lambda$ is the wavelength in Angstrom units; $d$ is the interplanar spacing of the crystal; $\theta$ is the angle between radiation and the planes.

For the crystal of the present invention, the specimen can be of any shape or size so long as it is large enough to cover a desired angular range which may be from 0–90° or any part of this range. The limiting edge confines radiation which can pass into the recording area to a small region on the crystal surface, any radiation striking the crystal away from this region will be stopped by shield 52. Different wavelengths from the specimen satisfy the diffraction condition by emanating from different regions on the specimen.

The present invention in the preferred form uses a film to record the spectra; therefore, there are no moving parts during recording of the spectra. The specimen, the slit, the diffracting crystal and the film are all stationary and no moving parts are needed since the whole spectra is diffracted at one time. Resolution is controlled by the narrow beam of any particular wavelength which will be diffracted by the small region of the crystal which satisfies the diffraction condition.

The invention is not limited to a film for recording the spectra since the dispersed radiation may be detected by other instruments such as a Geiger counter, proportional counter, or a scintillation counter, diagrammatically shown in Fig. 3. When a detector is used the detector is the only moving part, and such a detector can be used instead of a film in any of the illustrations shown or mentioned in this specification.

It should be understood, of course, that the foregoing disclosure relates to only preferred embodiments of the invention and that it is intended to cover all changes and modifications of the examples of the invention herein chosen for the purposes of disclosure, which do not constitute departure from the spirit and scope of the invention set forth in the appended claims.

What is claimed is:

1. A spectrograph comprising in combination means adapted to hold a specimen in the path of X-radiation, a radiation diffracting crystal, nonrotatable means for holding said radiation diffracting crystal in a stationary position to receive incident polychromatic radiation emanating from a specimen held in said specimen holding means, means for simultaneously recording radiation diffracted by said diffracting crystal, a radiation shield terminating at a position juxtaposed said diffracting crystal to define therewith a narrow diffraction limiting slit of a width such as to simultaneously pass therethrough only a narrow bundle of each wavelength of the incident radiation diffracted by said diffracting means, said radiation passing through said slit being recorded simultaneously throughout an angle from zero to 90 degrees wherein each recorded bundle of wavelengths are distinctly recorded as separate wavelengths without any overlap.

2. A spectrograph comprising in combination means adapted to hold a specimen in the path of X-radiation, a radiation diffracting single-crystal, nonrotatable means for holding said diffracting single-crystal in a stationary position to receive on an end surface incident polychromatic radiation emanating from all directions from a specimen held in said specimen holding means, means for simultaneously recording radiation diffracted by said diffracting single-crystal, an adjustable radiation shield terminating at a position juxtaposed said diffracting single-crystal to define therewith a narrow diffraction limiting slit of a width such as to simultaneously pass therethrough only a narrow bundle of each wavelength of the incident radiation diffracted by said diffracting crystal, said radiation passing through said slit being simultaneously recorded throughout an angle from zero to 90 degrees wherein each recorded bundle of wavelengths are distinctly recorded as separate wavelengths without any overlap.

3. A spectrograph as claimed in claim 2 in which said narrow diffraction limiting slit has a width of from about zero to about 0.5 cm.

4. A spectrograph comprising a light and radiation impervious enclosure having separable top and bottom portions, said top portion including sides extending downwardly to the bottom portion, one of said sides having an opening near one end thereof for admission of X-rays to an area of said enclosure, said enclosure containing in combination a specimen holder positioned as to expose a specimen therein to X-rays admitted through said opening, nonrotatable means holding a diffracting crystal in position to diffract radiation from a specimen in said specimen holding means, stationary means for recording the diffracted radiation, a radiation impermeable plate so arranged between said specimen holding means and said radiation recording means to prevent undesired radiation from reaching the latter, an opening in said plate, said crystal holding means being attached to said plate at one side of said opening therein, an adjustable radiation shield attached to said plate at the opposite side of said opening therein and movable with respect to said crystal holding means to form a slit of a width such as to pass therethrough only a narrow bundle of each wavelength of the radiation diffracted from said crystal which diverge on passing to said radiation recording means, said radiation passing through said slit being simultaneously recorded throughout an angle from zero to 90 degrees wherein each recorded bundle of wavelengths are distinctly recorded as separate wavelengths without any overlap.

References Cited in the file of this patent
UNITED STATES PATENTS

| | | |
|---|---|---|
| 2,449,066 | Friedman | Sept. 14, 1948 |
| 2,532,810 | Harker | Dec. 5, 1950 |
| 2,688,094 | DuMond | Aug. 31, 1954 |